(12) United States Patent
Doddi (10) Patent No.: US 12,225,627 B2
(45) Date of Patent: Feb. 11, 2025

(54) METHODS, SYSTEMS, AND COMPUTER READABLE MEDIA FOR REBALANCING SUBSCRIBER LOCATION FUNCTION (SLF) SUBSCRIBER DATA

(71) Applicant: Oracle International Corporation, Redwood Shores, CA (US)

(72) Inventor: Srikar Doddi, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 266 days.

(21) Appl. No.: 17/877,551

(22) Filed: Jul. 29, 2022

(65) Prior Publication Data

US 2024/0040366 A1     Feb. 1, 2024

(51) Int. Cl.
*H04W 8/20*       (2009.01)
*H04L 61/2585*    (2022.01)

(52) U.S. Cl.
CPC .......... *H04W 8/20* (2013.01); *H04L 61/2585* (2013.01)

(58) Field of Classification Search
None
See application file for complete search history.

(56) References Cited

U.S. PATENT DOCUMENTS

| 7,996,541 | B2 | 8/2011 | Marathe et al. |
| 8,089,942 | B2 | 1/2012 | Cai et al. |
| 8,326,263 | B2 | 12/2012 | Zhou et al. |
| 9,021,072 | B2 | 4/2015 | Atreya et al. |
| 9,225,849 | B2 | 12/2015 | Jackson et al. |
| 2002/0147845 | A1 | 10/2002 | Sanchez-Herrero et al. |

(Continued)

FOREIGN PATENT DOCUMENTS

| CN | 1889499 A | 1/2007 |
| CN | 101843077 A | 9/2010 |

(Continued)

OTHER PUBLICATIONS

First Examination Report for Indian Patent Application Serial No. 8612/CHENP/2013 (Apr. 23, 2019).

(Continued)

*Primary Examiner* — Suhail Khan
(74) *Attorney, Agent, or Firm* — Jenkins, Taylor & Hunt, P.A.

(57) ABSTRACT

A method for rebalancing SLF subscriber data includes, generating, by a provisioning gateway, a rebalancing report and transmitting the report to a provisioning system. The method further includes receiving, at the provisioning gateway and from the provisioning system, a request to initiate re-provisioning of subscriber data among SLF instances, the request for re-provisioning identifying a first range of subscriber identifiers currently assigned to a first SLF instance to be re-assigned to a second SLF instance. The method further includes, in response to the request to initiate the re-provisioning, signaling, by the provisioning gateway, transparently from the provisioning system, and with the first and second SLF instances to move subscriber database records having subscriber identifiers in the first range from a subscriber database maintained by the first SLF instance to a subscriber database maintained by the second SLF instance.

20 Claims, 8 Drawing Sheets

(56) References Cited

U.S. PATENT DOCUMENTS

| | | | |
|---|---|---|---|
| 2006/0002308 | A1 | 1/2006 | Na et al. |
| 2006/0136557 | A1 | 6/2006 | Schaedler et al. |
| 2007/0061397 | A1 | 3/2007 | Gregorat et al. |
| 2007/0115934 | A1 | 5/2007 | Dauster et al. |
| 2007/0116250 | A1 | 5/2007 | Stafford |
| 2007/0232301 | A1 | 10/2007 | Kueh |
| 2008/0046963 | A1 | 2/2008 | Grayson et al. |
| 2008/0052258 | A1 | 2/2008 | Wang et al. |
| 2008/0247526 | A1 | 10/2008 | Qiu et al. |
| 2008/0281975 | A1 | 11/2008 | Qiu et al. |
| 2008/0311917 | A1 | 12/2008 | Marathe et al. |
| 2010/0291923 | A1 | 11/2010 | Zhou et al. |
| 2011/0173332 | A1 | 7/2011 | Li et al. |
| 2011/0252123 | A1 | 10/2011 | Sridhar et al. |
| 2012/0188949 | A1 | 7/2012 | Salkintzis et al. |
| 2012/0281674 | A1 | 11/2012 | Jackson et al. |
| 2022/0337994 | A1* | 10/2022 | Targali ............... H04W 8/12 |

FOREIGN PATENT DOCUMENTS

| | | |
|---|---|---|
| CN | 201280022007.2 | 7/2017 |
| EP | 2 165 557 B1 | 5/2015 |
| EP | 2 705 698 B1 | 4/2016 |
| IN | 279484 | 1/2017 |
| JP | 2010-226470 | 10/2010 |
| JP | 5759064 B2 | 8/2015 |
| WO | WO 2007/045991 A1 | 4/2007 |
| WO | WO 2008/157213 A2 | 12/2008 |
| WO | WO 2010/052030 A1 | 5/2010 |
| WO | WO 2010/079715 A1 | 7/2010 |
| WO | WO 2010/080966 A1 | 7/2010 |
| WO | WO 2010/139360 A1 | 12/2010 |
| WO | WO 2012/154674 A2 | 11/2012 |

OTHER PUBLICATIONS

Decision to Grant for Chinese Patent Application No. ZL201280022007.2 (May 16, 2017).
Letter Regarding Second Office Action for Chinese Patent Application No. 201280022007.2 (Jan. 4, 2017).
Notification of the First Office Action for Chinese Application No. 201280022007.2 (May 5, 2016).
Decision to grant a European patent pursuant to Article 97(1) EPC for European Application No. 12781800.3 (Mar. 10, 2016).
Communication under Rule 71(3) EPC for European Application No. 12 781 800.3 (Jan. 7, 2016).
Notice of Allowance and Fee(s) Due & Examiner-Initiated Interview Summary for U.S. Appl. No. 13/465,601 (Aug. 28, 2015).
Letter Regarding Issued Patent for Japanese Patent Application No. 2014-509509 (Aug. 5, 2015).
Applicant-Initiated Interview Summary for U.S. Appl. No. 13/465,601 (Jul. 29, 2015).
Letter Regarding Notice of Grant for Japanese Patent Application No. 2014-509509 (Jun. 2, 2015).
Non-Final Office Action for U.S. Appl. No. 13/465,601 (May 6, 2015).
Advisory Action for U.S. Appl. No. 13/465,601 (Apr. 7, 2015).
Extended European Search Report for European Patent Application No. 12781800.3 (Mar. 23, 2015).
Applicant-Initiated Interview Summary for U.S. Appl. No. 13/465,601 (Dec. 5, 2014).
Letter Regarding First Office Action for Japanese Patent Application No. 2014-509509 (Oct. 7, 2014).
Final Office Action for U.S. Appl. No. 13/465,601 (Oct. 7, 2014).
Applicant-Initiated Interview Summary for U.S. Appl. No. 13/465,601 (Jun. 18, 2014).
Non-Final Office Action for U.S. Appl. No. 13/465,601 (Mar. 7, 2014).
Communication of European Publication Number and Information on the Application of Article 67(3) EPC for European Patent Application No. 12781800.3 (Feb. 12, 2014).
Notification of Transmittal of the International Search Report and the Written Opinion of the International Searching Authority, or the Declaration for International Patent Application No. PCT/US2012/036784 (Nov. 1, 2012).
PCT International Patent Application No. PCT/US2012/036784, Titled, "Methods, Systems, and Computer Readable Media for Steering a Subscriber Between Access Networks," (Unpublished, Filed May 7, 2012).
3rd Generation Partnership Project, "Technical Specification Group Services and System Aspects; Policy and charging control architecture (Release 11)," 3GPP TS 23.203, v11.5.0 (Mar. 2012).
3rd Generation Partnership Project, "Technical Specification Group Services and System Aspects; Study on Support of BBF Access Interworking (Release 11)," 3GPP TS 23.839, V0.06.0, pp. 1-27 (Apr. 2011).
3rd Generation Partnership Project, "Technical Specification Group Services and System Aspects; Policy and charging control architecture (Release 11)," 3GPP TS 23.203, v11.1.0 pp. 1-136 (Mar. 2011).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Huawei, Hisilicon, "QOS Negotiation between BBF and 3GPP," 3GPP TSG SA WG2 Meeting #82, pp. 1-7 (Nov. 15-19, 2010).
China Mobile et al., "Policy Control Based On Network Status," 3GPP TSG SA WG2 Meeting #81, pp. 1-2, (Oct. 2010).
Rao, "Mobile Broadband Evolution—LTE and EPC," Motorola General Business, LTE EPC IEEE ComSoC Boston (Apr. 8, 2010).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401, V8.4.1 (Dec. 2008).
Hearing Notice for Indian Patent Application No. 185/CHENP/2010 (Nov. 24, 2016).
Letter Regarding Board Decision for Chinese Patent Application No. 200880103119.4 (Sep. 23, 2016).
Second Notification of Reexamination for Chinese Patent Application No. 200880103119.4 (Apr. 21, 2016).
Notification of Reexamination for Chinese Application No. 200880103119.4 (Nov. 11, 2015).
First Examination Report for Indian Patent Application No. 185/CHENP/2010 (Jul. 28, 2015).
Decision to Grant a European Patent pursuant to Article 97(1) EPC for European Patent Application No. 08770806.1 (May 4, 2015).
Communication Under Rule 71(3) EPC for European Patent Application No. 08770806.1 (Mar. 3, 2015).
Communication pursuant to Article 94(3) EPC for European Patent Application No. 08770806.1 (Oct. 10, 2014).
Communication pursuant to Article 94(3) EPC for European Patent Application No. 08770806.1 (Aug. 6, 2014).
Final Office Action for Chinese Application No. 200880103119.4 (Dec. 4, 2013).
Extended European Search Report for European Application No. 08770806.1 (Dec. 2, 2013).
Third Office Action for Chinese Application No. 200880103119.4 (Aug. 19, 2013).
Second Office Action for Chinese Application No. 200880103119.4 (Mar. 19, 2013).
First Official Action for Chinese Patent Application No. 200880103119.4 (Jul. 4, 2012).
Notice of Allowance and Fee(s) Due for U.S. Appl. No. 11/888,907 (Apr. 1, 2011).
Official Action for U.S. Appl. No. 11/888,907 (Sep. 16, 2010).
Notification of Transmittal of the International Search Report and the Written Opinion of the International Searching Authority, or the Declaration for International Application No. PCT/US2008/066675 (Dec. 9, 2008).
"3rd Generation Partnership Project; Technical Specification Group Services and System Aspects; IP Multimedia Subsystem (IMS); Stage 2 (Release 8)," 3GPP TS 23.228, V8.1.0 (Jun. 2007).

(56) References Cited

OTHER PUBLICATIONS

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

"3rd Generation Partnership Project; Technical Specification Group Core Network and Terminals; 5G System; Unified Data Repository Services; Stage 3 (Release 17)," 3GPP TS 29.504, V17.7.0, pp. 1-55 (Jun. 2022).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"Cloud Native Unified Data Repository User's Guide," Oracle Communications, Release 1.8, pp. 1-154 (Sep. 2020).

\* cited by examiner

METHODS, SYSTEMS, AND COMPUTER READABLE MEDIA FOR REBALANCING SUBSCRIBER LOCATION FUNCTION (SLF) SUBSCRIBER DATA

TECHNICAL FIELD

The subject matter described herein relates to managing subscriber data maintained by SLF instances. More particularly, the subject matter described herein relates to methods, systems, and computer readable media for rebalancing SLF subscriber data.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other types of networks is that the SLF performs important functions in 4G and 5G networks and can become overloaded or unavailable due to imbalances of subscriber records among SLF instances. In 4G networks, when more than one home subscriber server (HSS) is deployed in the network, the SLF contains subscriber database records that identify the HSS that contains subscription and location information for the subscriber. In 5G networks, the SLF subscriber database contains NF group ID information corresponding to subscriber identifiers, which is used by querying NRFs and SCPs to identify NF groups (e.g., HSS or UDM groups) containing subscription and location information for a subscriber. With increasing numbers of human subscribers and non-human devices, there is ever increasing demand of scalability of database sizes. This brings in a need of rebalancing and repartitioning the databases. The SLF is one such function which holds the subscriber information. The SLF provides an interface to other network functions in 4G and 5G network to obtain subscriber information. Each subscriber could be mapped to a set of network functions using network slices, and the location of the HSS or other database that contains subscription information for the subscriber is stored in the SLF subscriber database.

When the subscriber count and hence the SLF subscriber database size grows, there is a need to add extra capacity to the database. Adding capacity to the SLF subscriber database can result in a need for rebalancing and repartitioning. The SLF subscriber database is required to be highly available and able to quickly respond to queries for subscriber information. If an SLF subscriber database becomes too large, the SLF can become congested with excessive query traffic and even become unavailable. However, taking the database out of service for rebalancing is undesirable because of the high availability requirement of SLFs.

Accordingly, in light of these and other difficulties, there exists a need for improved methods, systems, and computer readable media for rebalancing SLF subscriber data.

SUMMARY

A method for rebalancing SLF subscriber data includes, generating, by a provisioning gateway, a rebalancing report and transmitting the report to a provisioning system. The method further includes receiving, at the provisioning gateway and from the provisioning system, a request to initiate re-provisioning of subscriber data among SLF instances, the request for re-provisioning identifying a first range of subscriber identifiers currently assigned to a first SLF instance to be re-assigned to a second SLF instance. The method further includes, in response to the request to initiate the re-provisioning, signaling, by the provisioning gateway, transparently from the provisioning system, and with the first and second SLF instances to move subscriber database records having subscriber identifiers in the first range from a subscriber database maintained by the first SLF instance to a subscriber database maintained by the second SLF instance.

According to another aspect of the subject matter described herein, the method for rebalancing SLF subscriber data include receiving, at the provisioning gateway and from the provisioning system, a request to reconfigure subscriber database records among the SLF instances, and, in response, assigning, to the second SLF instance, a second range of available subscriber identifiers currently assigned to the first SLF instance, and receiving, by the provisioning gateway and from the provisioning system, a request to create, in the subscriber database maintained by the second SLF instance, a subscriber database record corresponding to a subscriber identifier within the second range. The method for rebalancing SLF subscriber data further includes, in response, signaling with the second SLF instance to create, in the subscriber database maintained by the second SLF instance, the subscriber database record corresponding to the subscriber identifier in the second range.

According to another aspect of the subject matter described herein, generating the rebalancing report includes generating a report that details empty ranges of subscriber identifiers assigned to the first SLF instance for a configured chunk size.

According to another aspect of the subject matter described herein, the method for rebalancing SLF subscriber data includes generating the request to initiate the re-provisioning in response to a determination that that a number of empty ranges of subscriber identifiers assigned to the first SLF instance for the configured chunk size is below a minimum threshold value.

According to another aspect of the subject matter described herein, the method for rebalancing SLF subscriber data includes generating the request for reconfiguring the subscriber identifier ranges in response to determining that a number of empty ranges of subscriber identifiers assigned to the first SLF instance for a configured chunk size exceeds a threshold value.

According to another aspect of the subject matter described herein, the subscriber identifiers comprise at least one of mobile subscriber integrated services digital network (MSISDN) numbers, international mobile subscriber identifiers (IMSIs) and subscription permanent identifiers (SUPIs).

According to another aspect of the subject matter described herein, signaling with the first and second SLF instances to move subscriber database records having subscriber identifiers in the first range includes querying the first SLF instance using an application programming interface (API) provided by the first SLF instance.

According to another aspect of the subject matter described herein, signaling with the first and second SLF instances to move subscriber database records having subscriber identifiers in the first range includes creating the subscriber database records having the subscriber identifiers in the first range in the subscriber database maintained by the second SLF instance using an API provided by the second SLF instance.

According to another aspect of the subject matter described herein, the method for rebalancing SLF subscriber data includes, at the provisioning gateway, signaling with the first and second SLF instances to inform the first and second SLF instance of changes in subscriber identifiers assigned to the first and second SLF instances.

According to another aspect of the subject matter described herein, the method for rebalancing the SLF subscriber data includes, at the first and second SLF instances, signaling with a network function repository function (NRF) to inform the NRF of the changes in subscriber identifiers assigned to the first and second SLF instances.

According to another aspect of the subject matter described herein, a system for rebalancing subscriber location function (SLF) subscriber data is provided. The system includes, a provisioning gateway including at least one processor. The system further includes an SLF subscriber database record rebalancer implemented by the at least one processor for generating a rebalancing report, transmitting the rebalancing report to a provisioning system, receiving, from the provisioning system, a request to initiate re-provisioning of subscriber data among SLF instances, the request for re-provisioning identifying a first range of subscriber identifiers currently assigned to a first SLF instance to be re-assigned to a second SLF instance, and, in response to the request to initiate the re-provisioning, signaling, by the provisioning gateway, transparently from the provisioning system, and with the first and second SLF instances to move subscriber database records having subscriber identifiers in the first range from a subscriber database maintained by the first SLF instance to a subscriber database maintained by the second SLF instance.

According to another aspect of the subject matter described herein, the SLF subscriber database record rebalancer is configured to: receive, from the provisioning system, a request to reconfigure subscriber database records among the SLF instances, and, in response, assigning, to the second SLF instance, a second range of available subscriber identifiers currently assigned to the first SLF instance; receive, from the provisioning system, a request to create, in the subscriber database maintained by the second SLF instance, a subscriber database record corresponding to a subscriber identifier within the second range; and, in response, signal with the second SLF instance to create, in the subscriber database maintained by the second SLF instance, the subscriber database record corresponding to the subscriber identifier in the second range.

According to another aspect of the subject matter described herein, the rebalancing report details empty ranges of subscriber identifiers assigned to the first SLF instance for a configured chunk size.

According to another aspect of the subject matter described herein, the request to initiate the re-provisioning is generated in response to a determination that that a number of empty ranges of subscriber identifiers assigned to the first SLF instance for the configured chunk size is below a minimum threshold value.

According to another aspect of the subject matter described herein, the request for reconfiguring the subscriber identifier ranges is generated in response to a determination that a number of empty ranges of subscriber identifiers assigned to the first SLF instance for a configured chunk size exceeds a threshold value.

According to another aspect of the subject matter described herein, the subscriber identifiers comprise at least one of mobile subscriber integrated services digital network (MSISDN) numbers, international mobile subscriber identifiers (IMSIs) and subscription permanent identifiers (SUPIs).

According to another aspect of the subject matter described herein, the SLF subscriber database record rebalancer is configured to move subscriber database records having subscriber identifiers in the first range by querying the first SLF instance using an application programming interface (API) provided by the first SLF instance.

According to another aspect of the subject matter described herein, the SLF subscriber database record rebalancer is configured to signal with the first and second SLF instances to move subscriber database records having subscriber identifiers in the first range by creating the subscriber database records having the subscriber identifiers in the first range in the subscriber database maintained by the second SLF instance using an API provided by the second SLF instance.

According to another aspect of the subject matter described herein, the SLF subscriber database record rebalancer is configured to signal with the first and second SLF instances to inform the first and second SLF instance of changes in subscriber identifiers assigned to the first and second SLF instances.

According to another aspect of the subject matter described herein, a non-transitory computer readable medium having stored thereon executable instructions that when executed by a processor of a computer control the computer to perform steps is provided. The steps include at a provisioning, generating a rebalancing report and transmitting the rebalancing report to a provisioning system. The steps further include receiving, at the provisioning gateway and from the provisioning system, a request to initiate re-provisioning of subscriber data among subscriber location function (SLF) instances, the request for re-provisioning identifying a first range of subscriber identifiers currently assigned to a first SLF instance to be re-assigned to a second SLF instance. The steps further include, in response to the request to initiate the re-provisioning, signaling, by the provisioning gateway, transparently from the provisioning system, and with the first and second SLF instances to move subscriber database records having subscriber identifiers in the first range from a subscriber database maintained by the first SLF instance to a subscriber database maintained by the second SLF instance.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
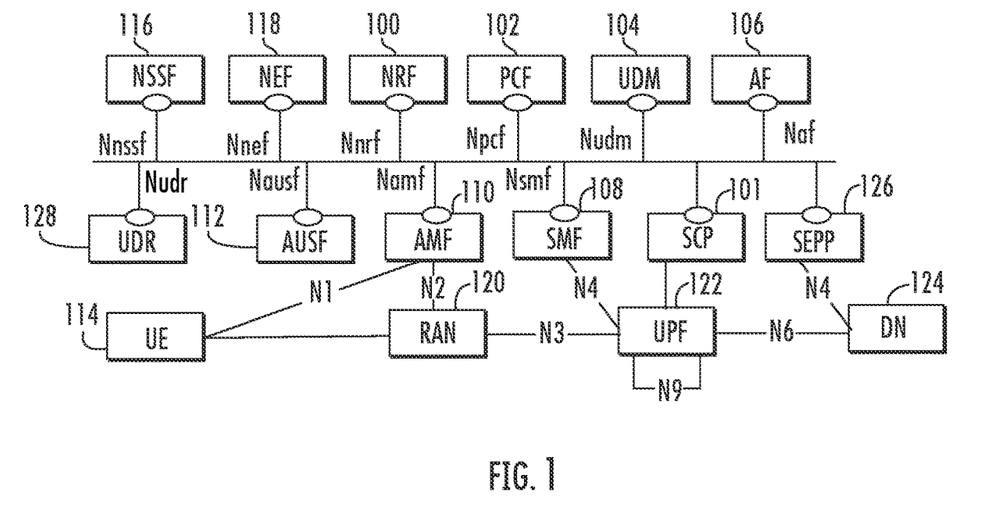
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a unified data management (UDM) 104 that manages user data, and an application function (AF) 106 that provides application services.

The NFs illustrated in FIG. 1 further include an SMF 108 that manages sessions between AMF 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

The 5G network also includes a unified data repository (UDR) 128, which stores subscription data, policy data, structured data for exposure, application data, and group ID mapping data. UDR 128 provides access to its stored data to other 5G NFs using Nudr service operations defined in 3GPP TS 29.504. One of the Nudr service operations is the Nudr_GroupIDmap service operation, which is defined in Section 5.3 of 3GPP TS 29.504. The Nudr_GroupIDmap service operation may be used by NF service consumers, such as SCPs and NRFs, to retrieve the NF group ID for a given NF type and subscriber identifier. For example, the NRF may use the Nudr_GroupIDmap service to obtain the NF group ID of an HSS or UDM that contains subscription information for a particular subscriber identifier. When a UDR is deployed to provide only the Nudr_GroupIDmap service operation, the UDR is referred to as an SLF. Thus, as used herein, the term "SLF" includes a UDR deployed to provide only the Nudr_GroupIDmap service operation, as well as more generic definition of a network function that provides group identifier information for a network function, such as an HLR, UDM, or HSS, that stores subscription and/or location information for a subscriber.

As stated above, SLFs provide the mappings between subscriber identifiers and home subscriber servers or other database nodes that store subscription information for the subscribers. An SLF instance, as described herein, is a network node that performs an SLF function. Such a network node includes software as well as hardware and/or firmware for performing SLF functions, such as responding to queries for subscriber information. One problem that can occur in 5G and other types of networks is that SLF instances can become overloaded as the number of subscribers increases. Thus, there is a need to transparently rebalance subscribers among subscriber databases maintained by different SLF instances.

In order to address this need, the subject matter described herein includes a provisioning gateway that interfaces with SLF instances to dynamically rebalance subscriber data among databases maintained by different SLF instances without downtime or service disruption. The provisioning gateway operates transparently from network operator provisioning systems to achieve SLF subscriber data rebalancing. Using the provisioning gateway, a network operator can generate a rebalancing report, which gives the available chunks of subscriber identifier ranges. Using this information, rebalancing of subscriber records among SLF instances can be achieved by operating in a re-provisioning mode of operation in which subscriber database records currently assigned to one SLF instance are moved to another SLF instance and reconfiguration mode in which available empty subscriber identifier ranges are allocated among SLF instances to control the assignment of new subscriber records to the SLF instances.

Re-provisioning mode may be used if the number and/or size of empty subscriber identifier ranges assigned to a given SLF instance is less than a threshold value. If the number and/or size of available subscriber identifier ranges is less than the threshold value, the provisioning gateway operates in the re-provisioning mode to re-provision subscribers from the overloaded or full SLF instance to an SLF instance with more database and processing capacity in a manner that ensures that there is no downtime during movement of subscriber data. If the number and/or size of empty subscriber identifier ranges assigned to a given SLF instance is greater than a threshold (which may be greater than the threshold that triggers re-provisioning), the provisioning gateway operates in reconfiguration mode to reallocate subscriber identifier ranges to different SLF instances and assign new subscribers to the SLF instances using the reallocated ranges. In reconfiguration mode, records for subscriber identifiers currently assigned to SLF instances are not moved to new SLF instances. In other words, the reallocation of ranges only affects the SLF instances to which new subscriber identifiers are assigned.

During the rebalancing of the subscriber data, there is no downtime, and the process is transparent from the customer provisioning system (CPS) and consumers of the SLF, such as the NRF. This solution solves the database growth problem for SLF databases in 4G, 5G, and higher generation networks. In one example, the solution includes generating a rebalancing report before the procedure is executed and allows the network operator to determine the subscriber database partitions. In another example, the provisioning gateway may rebalance the subscriber data among the SLF instances in an automated manner based on the contents of the rebalancing report.

Using the above-mentioned reconfiguration and re-provisioning modes of operation, the network operator can control how the rebalancing is achieved. Using the rebalancing solution described herein, subscriber records can be rebalanced independently of the underlying database technology and without application or database restarts. Traditionally, this type of activity is performed using database partitioning tools, which is dependent on the database technology used. Using traditional partitioning, there is typically a brief down time, and, in some instances, applications may be required to use a cloned copy of a database during the partitioning procedure. Such partitioning can be time consuming and require database experts for implementation.

The solution described herein includes a 5G SLF which includes the SLF subscriber database and exposes interfaces towards the NRF/SCP as defined by the 3GPP standards. The solution further includes the provisioning gateway, which is not a 3GPP standardized network function and which is used to provision the SLF subscriber database records and exposes provisioning API interfaces towards the provisioning system.

The provisioning gateway has the capability to provision subscribers across different SLF instances. Based on the configured subscriber identifier ranges, the provisioning gateway chooses the SLF instance on which a subscriber database record is created.

Figure 2:
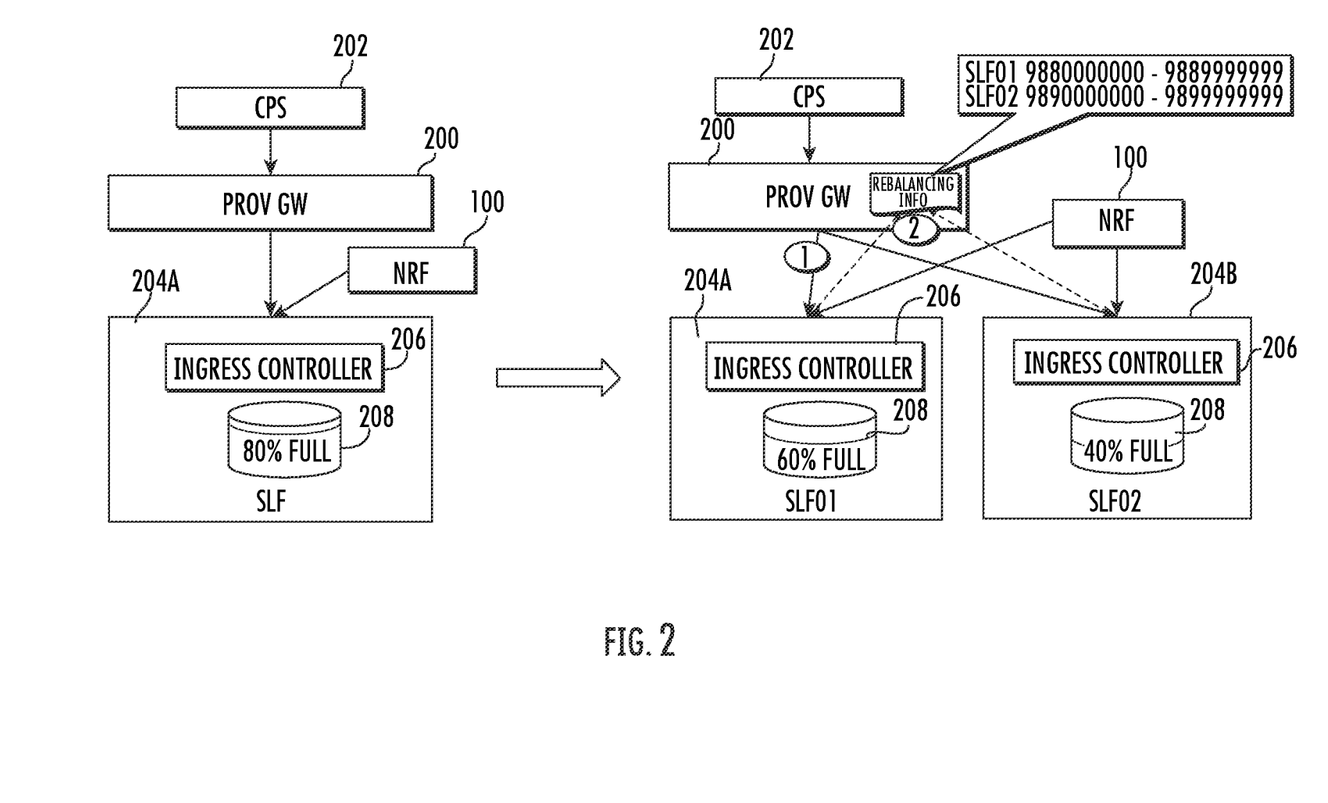
FIG. 2 is a network diagram illustrating rebalancing of subscriber data among SLF instances.

FIG. 2 is a diagram illustrating the use of the provisioning gateway to rebalance subscriber database records among SLF instances. Referring to FIG. 2, provisioning gateway 200 receives rebalancing requests from customer provisioning system 202 and rebalances subscriber database records among SLF instances 204A and 204B. Each SLF instance 204A and 204B includes an ingress controller 206, which sits in front of an API and acts as a single point of entry for each SLF instance. Provisioning gateway 200 operates in a re-provisioning mode to seamlessly move subscriber database records from SLF instance 204A to SLF instance 204B and in a reconfiguration mode to change ranges of subscriber identifiers assigned to SLF instances 204A and 204B for new subscriber database record creation. Provisioning gateway 200 performs the rebalancing by signaling with SLF instances 204A and 204B using provisioning application programming interfaces without down time of SLF instances 204A and 204B. In addition, SLF instances 204A and 204B inform NRF 100 of changes in allocations of subscriber identifier ranges using the 3GPP-defined NF update service operation.

Figure 3:
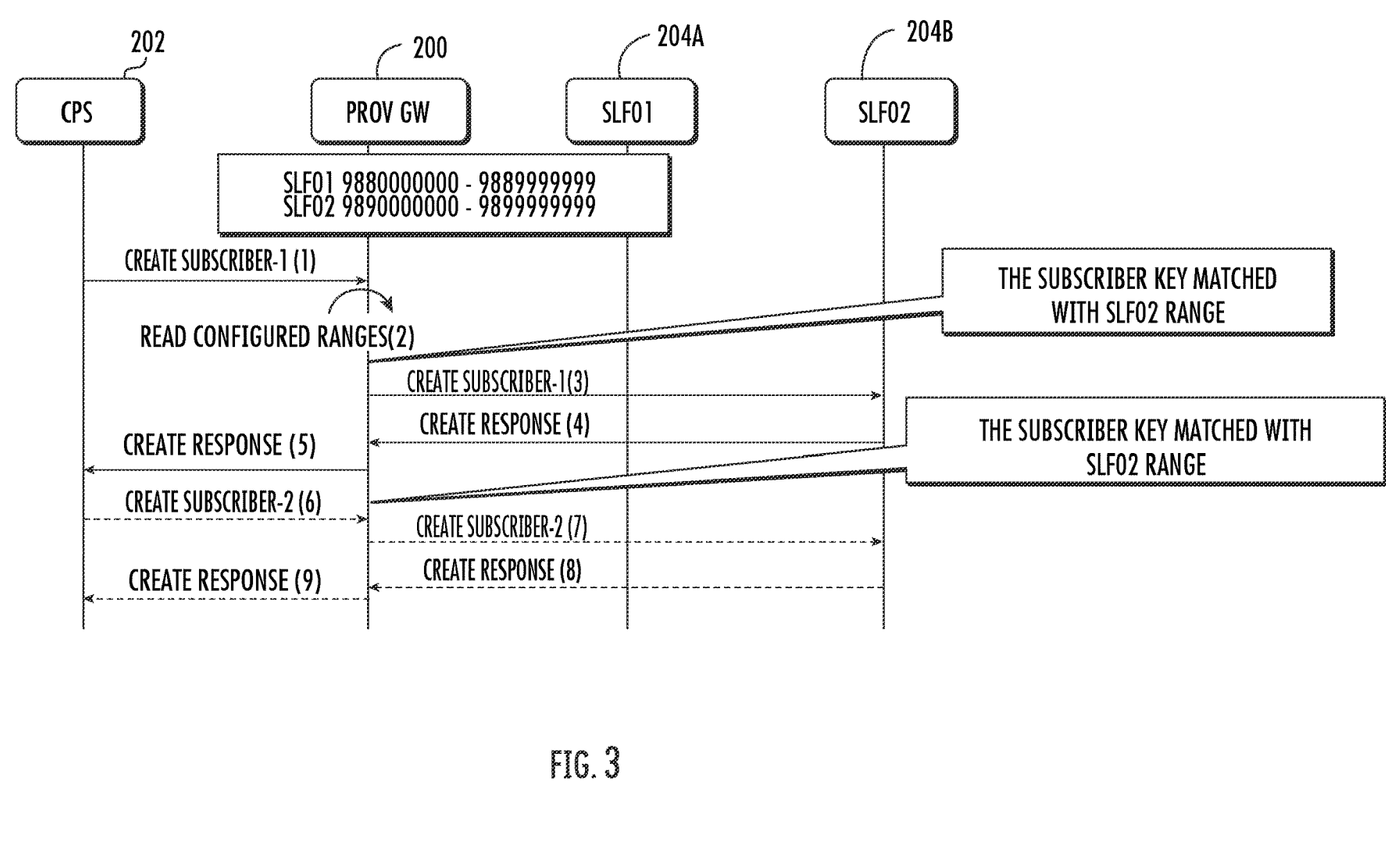
FIG. 3 is a message flow diagram illustrating exemplary messages exchanged in creating subscriber records in subscriber databases maintained by SLF instances.

FIG. 3 is a message flow diagram illustrating exemplary messages exchanged in creating subscriber records on SLF instances in a network including plural SLF instances. Referring to FIG. 3, in line 1, customer provisioning system 202 sends a create subscriber request message to provisioning gateway 200. The create subscriber request message is formatted according to an API provided by provisioning gateway 200 and includes a subscriber identifier, such as a mobile subscriber integrated services digital network (MSISDN) number. In line 2, in response to receiving the create subscriber request message, provisioning gateway 200 reads the subscriber identifier from the create subscriber request message, reads the subscriber identifier ranges assigned to SLF instances 204A and 204B, and selects the SLF instance corresponding to the subscriber identifier range in which the subscriber identifier in the create subscriber request message falls. In the illustrated example, it is assumed that the subscriber identifier falls in the range assigned to SLF instance 204B. Accordingly, in line 3, provisioning gateway 200 sends a create subscriber request message to SLF instance 204B. The create subscriber request message in line 3 may be formatted according to the API provided by SLF instance 204B.

SLF instance 204B receives the create subscriber request message, validates the request, and creates a record corresponding to the subscriber in the subscriber database maintained by SLF instance 204B. In line 4, SLF instance sends a create subscriber response message to provisioning gateway 200 indicating successful creation of the subscriber database record. Provisioning gateway 200 receives the create subscriber response message and, in line 5, sends a corresponding create subscriber response message to customer provisioning system 202 indicating successful creation of the subscriber database record.

In line 6, customer provisioning system 202 sends a create subscriber request message to provisioning gateway 200 for creating a subscriber database for a different subscriber. Provisioning gateway 200 receives the request, validates the request, and determines that the subscriber identifier in the request falls within the range of subscriber identifiers assigned to SLF instance 204B. Accordingly, in line 7, provisioning gateway 200 sends a create subscriber request message to SLF instance 204B. SLF instance 204B receives the request, validates the request, creates a corresponding record in its subscriber database, and, in line 8 sends a create subscriber response message indicating successful creation of the record for the subscriber identifier in its subscriber database. In line 9, provisioning gateway 200 sends a create subscriber response message to customer provisioning system 202. The process in FIG. 3 may be repeated each time a new subscriber is added to the network.

According to an aspect of the subject matter described herein, provisioning gateway 200 may create a rebalancing report. Provisioning gateway 200 may create the rebalancing report by reading subscriber identifier ranges currently assigned to SLF instances and reading subscriber identifiers corresponding to existing subscriber database records within each range. Provisioning gateway 200 may include in the report a list of empty ranges of a chunk size, where the chunk size is configurable by the network operator. Subscriber identifier ranges of chunk size which are available (no subscriber identifiers allocated within a given range) are reported. Subscriber identifier ranges with allocated subscriber identifiers are not indicated as available in the report. Provisioning gateway 200 may periodically create the rebalancing report. An example of a rebalancing report for one SLF instance is illustrated below in Table 1.

TABLE 1

| Subscriber Rebalancing Report | | | |
| --- | --- | --- | --- |
| SLF Instance ID | Start Range | End Range | No. of Chunks |
| SLF01 | 9890000000 | 9890100000 | 1 |
|  | 9989000000 | 9989020000 | 2 |
|  | 8987000000 | 8987010000 | 1 |

Provisioning gateway 200 may deliver the subscriber rebalancing report to customer provisioning system 202. The network operator may decide based on the contents of the subscriber rebalancing report as to whether any of the subscriber identifiers need to be rebalanced among SLF instances. For example, if there are no available ranges with the configured chunk size, the network operator may initiate the re-provision mode of operation of provisioning gateway 200 to move subscriber database records among SLF instances. If there are available ranges of the chunk size on a given SLF instance, the network operator may implement reconfiguration mode of operation of provisioning gateway 200 to re-assign subscriber identifier ranges among SLF instances.

Each subscriber database record has fields which uniquely identify the record. These fields include the MSISDN, which is a unique identifier for which the subscriber identifier ranges are configured. Other fields that may be included in a subscriber database record include user data, such as the SLF group identifier and NF group ID map data.

As indicated above, re-provisioning mode includes moving existing subscriber records among (or between) SLF instances. In this mode, the SLF instances are reconfigured with new set of ranges, and subscribers are rebalanced/moved across all SLF instances. Any subscriber database record located in a subscriber database of an SLF instance which is not part of the new configured range is moved to the new SLF instance. Provisioning gateway 200 uses the API provided by SLF to implement the query, delete and create SLF subscriber database record operations. During the process, provisioning gateway 200 ensures that the subscriber database record is deleted only after the subscriber database record is moved to new SLF instance. For any updates while a subscriber database record is being moved, provisioning gateway 200 may copy the updated data to the subscriber database record before deleting the record from the older SLF instance.

Figure 4:
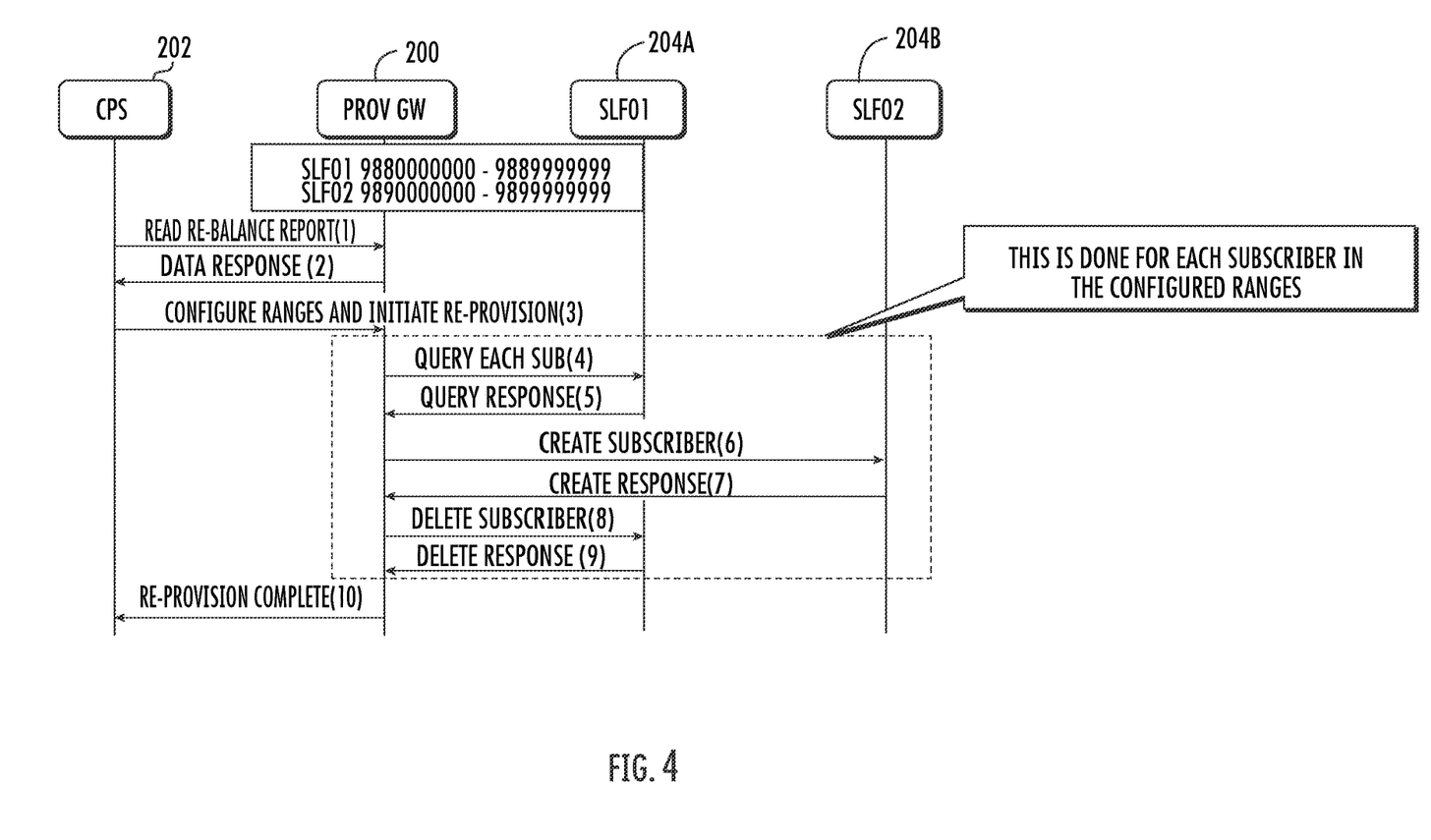
FIG. 4 is a message flow diagram illustrating re-provisioning of existing subscriber records among subscriber databases maintained by SLF instances.

FIG. 4 is a message flow diagram illustrating exemplary messages exchanged in operating in the re-provisioning operation mode. Referring to FIG. 4, in line 1, customer provisioning system 202 requests a rebalancing report from provisioning gateway 200. In line 2, provisioning gateway 200 responds with the rebalancing report.

The network operator reads the rebalancing report, and, in line 3, causes customer provisioning system 202 to reconfigure subscriber identifier ranges assigned to SLF instances and initiate re-provisioning based on the new ranges. In line 4 of the message flow diagram, provisioning gateway 200 initiates the process of identifying subscribers that are in a range of subscriber identifiers that are being moved to another SLF instance by sending a subscriber information query message to SLF instance 204A. In line 5, SLF instance 204A sends a response to the subscriber information query message that contains the data for the subscriber database record to be moved to SLF instance 204B.

In line 6, for each subscriber being moved, provisioning gateway 200 sends a create subscriber request message to SLF instance 204B, which is the SLF instance to which the subscriber records are being moved. In line 7 of the message flow diagram, for each request, SLF instance 204B responds with a create subscriber response indicating whether or not the subscriber record was successfully moved.

Once provisioning gateway 200 determines that all of the desired subscriber records have been successfully moved, in line 8, provisioning gateway 200 sends a delete subscriber request to SLF instance 204A for each subscriber record that has been moved. SLF instance 204A responds to each delete subscriber request with a delete subscriber response indicating whether or not this deletion of the subscriber record was successful. In line 10, provisioning gateway 200 send a re-provisioning complete message to customer provisioning system 202 indicating that re-provisioning of subscriber records has been completed.

As stated above, another mode of operation of provisioning gateway 200 is reconfiguration mode. In this mode, the SLF instances are reconfigured with new sets of ranges, and the existing subscriber data is not moved among the SLF instances. Based on the rebalancing report, a new SLF instance may be created, and provisioning gateway 200 is configured with subscriber identifier ranges for the new SLF instance which were marked as available from the report. When provisioning gateway 200 receives a request to create a new subscriber record, and the subscriber identifier for the subscriber record is within a range of subscriber identifiers assigned to the new SLF instance, provisioning gateway 200 will send a request message to the new SLF instance requesting that the subscriber record be created on the new SLF instance. The assignment of new subscriber records to the new SLF instance will reduce the burden on existing SLF instance. Updates to existing subscriber records on existing SLF instances will continue as normal, meaning that updates will be routed to the SLF instance on which the subscriber record resides.

Figure 5:
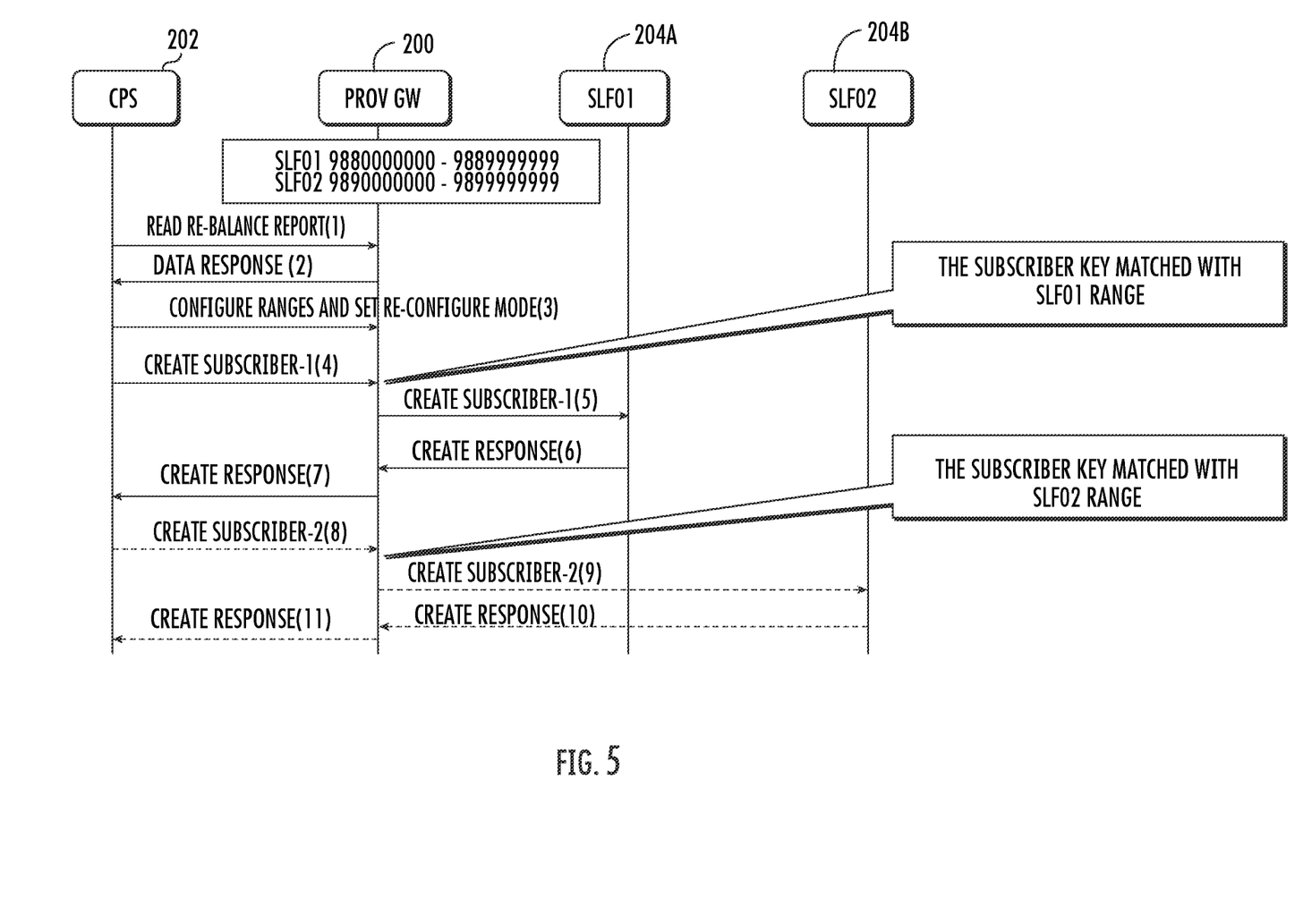
FIG. 5 is a message flow diagram illustrating exemplary messages exchanged in reconfiguring subscriber databases of SLF instances to store records for new ranges of subscriber identifiers.

FIG. 5 is a message flow diagram illustrating exemplary messages exchanged in operating in reconfiguration mode where subscriber identifiers are assigned to a new SLF instance without moving existing subscriber records. Referring to FIG. 5, in line 1, customer provisioning system 202 requests a rebalancing report from provisioning gateway 200. In line 2, provisioning gateway 200 sends the rebalancing report to customer provisioning system 202. As illustrated above in Table 1, the rebalancing report shows subscriber identifier ranges that are available on SLF instances. In this example, it is assumed that customer provisioning system 202 determines that there are available ranges of subscriber identifiers on SLF instance 204A that can be allocated to a new SLF instance, which in this example is SLF instance 204B.

In line 3 of the message flow diagram, customer provisioning system 202 configures the ranges of subscriber identifiers assigned to new SLF instance 204B and initiates reconfiguration mode.

In line 4, customer provisioning system 202 sends a create subscriber request to provisioning gateway 200. Provisioning gateway 200 reads a subscriber identifier contained in the create subscriber request, performs a lookup in its SLF assignment database, and determines that the identified subscriber is assigned to SLF instance 204A. Accordingly, in line 5, provisioning gateway 200 sends a create subscriber request to SLF instance 204A. In line 6, SLF instance 204A sends a create subscriber response to provisioning gateway 200 indicating successful creation of the subscriber record. In line 7, provisioning gateway 200 sends a create subscriber response to customer provisioning system 202.

In line 8 of the message flow diagram, customer provisioning system 202 sends another create subscriber request to provisioning gateway 200. Provisioning gateway 200 receives the create subscriber request, extracts a subscriber identifier from the create subscriber request, and determines that the subscriber identifier is within a range of subscriber identifiers assigned to SLF instance 204B. Accordingly, in line 9, provisioning gateway sends a create subscriber request to SLF instance 204B. In line 10, SLF instance 204B sends a create subscriber response to provisioning gateway 200 indicating successful creation of the subscriber database record. In line 11, provisioning gateway 200 sends a create subscriber response to provisioning system 202.

As defined by 3GPP standards, the SLF registers with the NRF and, as part of the registration, informs the NRF of a set of subscription permanent identifier (SUPI) ranges assigned to the SLF. It should be noted that while the description above uses MSISDN numbers as examples of subscriber identifiers that can be used to rebalance subscriber database records, any subscriber identifier or combination of subscriber identifiers can be used, including the SUPI, IMSI, and/or MSISDN. The subject matter described herein includes a new procedure for the SLF to inform the NRF of newly assigned subscriber identifier ranges in a manner that reduces the likelihood of downtime for interaction between the SLF and NRF caused by the re-provisioning and reconfiguration procedures described herein. According to the subject matter described herein, provisioning gateway 200 sends a range update message to the SLF to inform the SLF of its newly configured subscriber identifier ranges. The SLF may use the NF update procedure to inform the NRF of the newly configured subscriber identifier ranges. The NRF or SCP is notified of reconfigured ranges and queries the correct SLF to obtain the NF group ID for each SLF. 3GPP TS 29.504, TS 29.510 and TS 23.501 describe exemplary message flows that can be used to update the NRF with subscriber identifier ranges newly assigned to SLFs. For example, NRF 100 may utilize the Nudr_GroupIDmap service operation defined in section 5.3.1 of 3GPP TS 29.504 to query SLF instances and obtain the NF group ID for each of the SLF instances. The NFUpdate service operation defined in section 5.2.2.3 of 3GPP TS 29.510 can be used by the SLF instances to notify the NRF when subscriber identifier ranges assigned to the SLF instances change. Section 5.2 of 3GPP TS 29.510 also specifies details of NF management services which all NFs, including the SLF, can use. The SLF (or UDR that provides only the Nudr_GroupIDmap service) registers, as part of its NF profile with the NRF, a udrinfo attribute, which can be populated with ranges of subscriber identifiers using the signaling described below with respect to FIG. 6. The udrinfo attribute is sent via the NFProfile object, and the SLF uses NFUpdate operation to send the updates to the NRF. 3GPP TS 23.501 describes the overall architecture for the 5G system.

Figure 6:
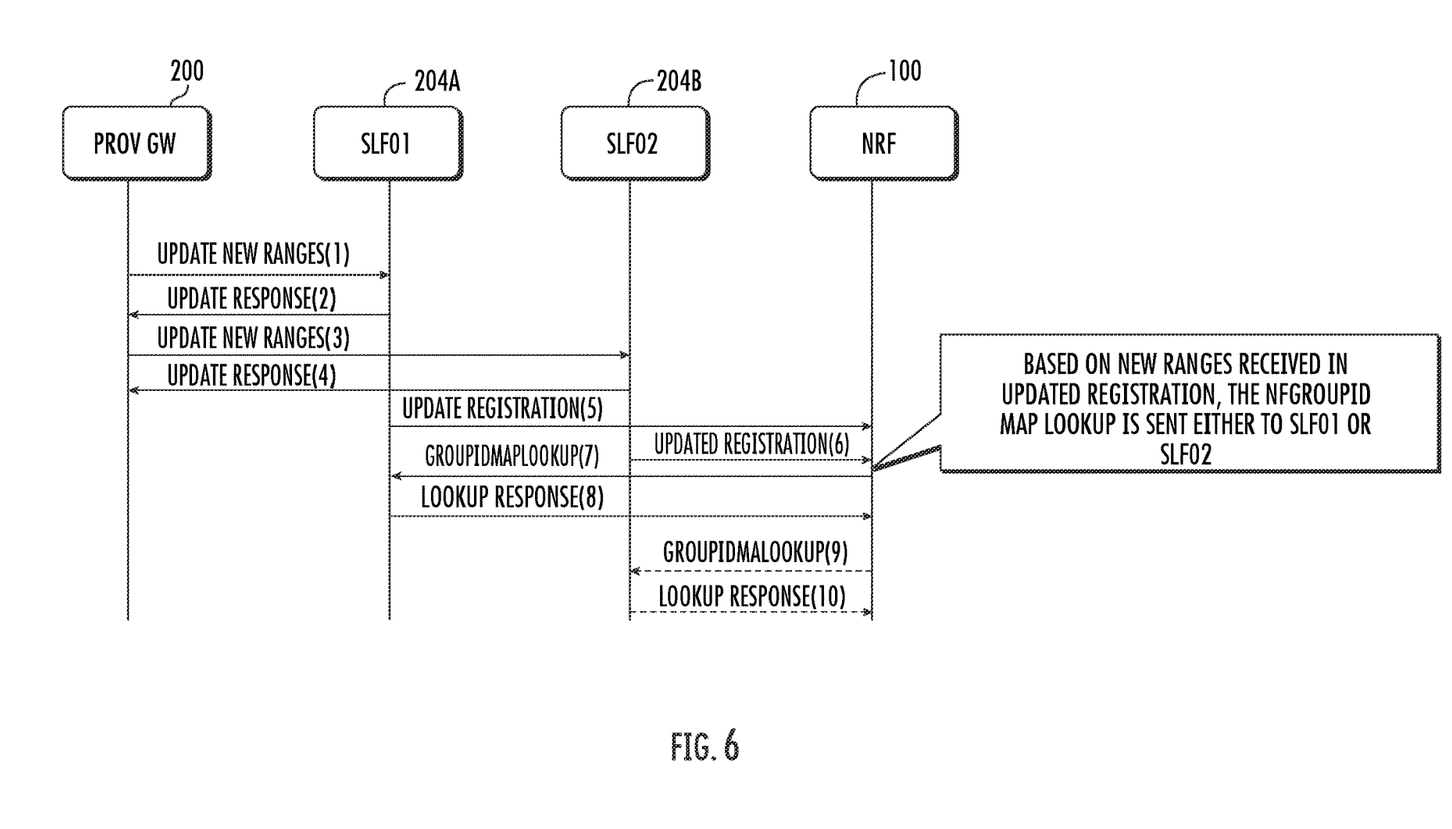
FIG. 6 is a message flow diagram illustrating exemplary messages exchanged in updating SLF registration with an NRF after subscriber data rebalancing.

FIG. 6 is a message flow diagram illustrating exemplary messages exchanged to update the NRF after subscriber records are rebalanced among SLF instances. Referring to FIG. 6, in line 1, provisioning gateway 200 updates SLF instance 204A with new subscriber identifier ranges. In line 2, SLF instance 204A responds to provisioning gateway 200 confirming successful updating of the subscriber identifier ranges.

In line 3, provisioning gateway 200 sends a message to SLF instance 204B to update SLF instance 204B with new subscriber identifier ranges. In line 4, SLF instance 204B responds indicating that the updating was successful.

In line 5, SLF instance 204A sends an update registration message to NRF 100. The update registration message may be an NFUpdate request or other message sent at an interval set by NRF 100 at NF registration. The NFUpdate request may specify the new ranges of subscriber identifiers in a udrinfo attribute to replace the ranges specified in the udrinfo attribute of the NF profile of SLF instance 204A during NF registration. In line 6, SLF instance 204B sends an update registration message to NRF 100. In line 7, NRF 100 sends an Nudr_GroupIDmap query message to SLF instance 204A to obtain NF group IDs for the subscriber identifiers in the newly defined subscriber identifier ranges. In line 8, SLF instance 204A responds to the Nudr_GroupIDmap query message with a response message containing the NF group ID corresponding to the subscriber identifier in the query message. In line 9, NRF 100 sends an Nudr_GroupIDmap query message to SLF instance 204B. In line 10, SLF instance 204B responds to the Nudr_GroupIDmap request message with a response message containing the NF group ID corresponding to the subscriber identifier in the query message.

Figure 7:
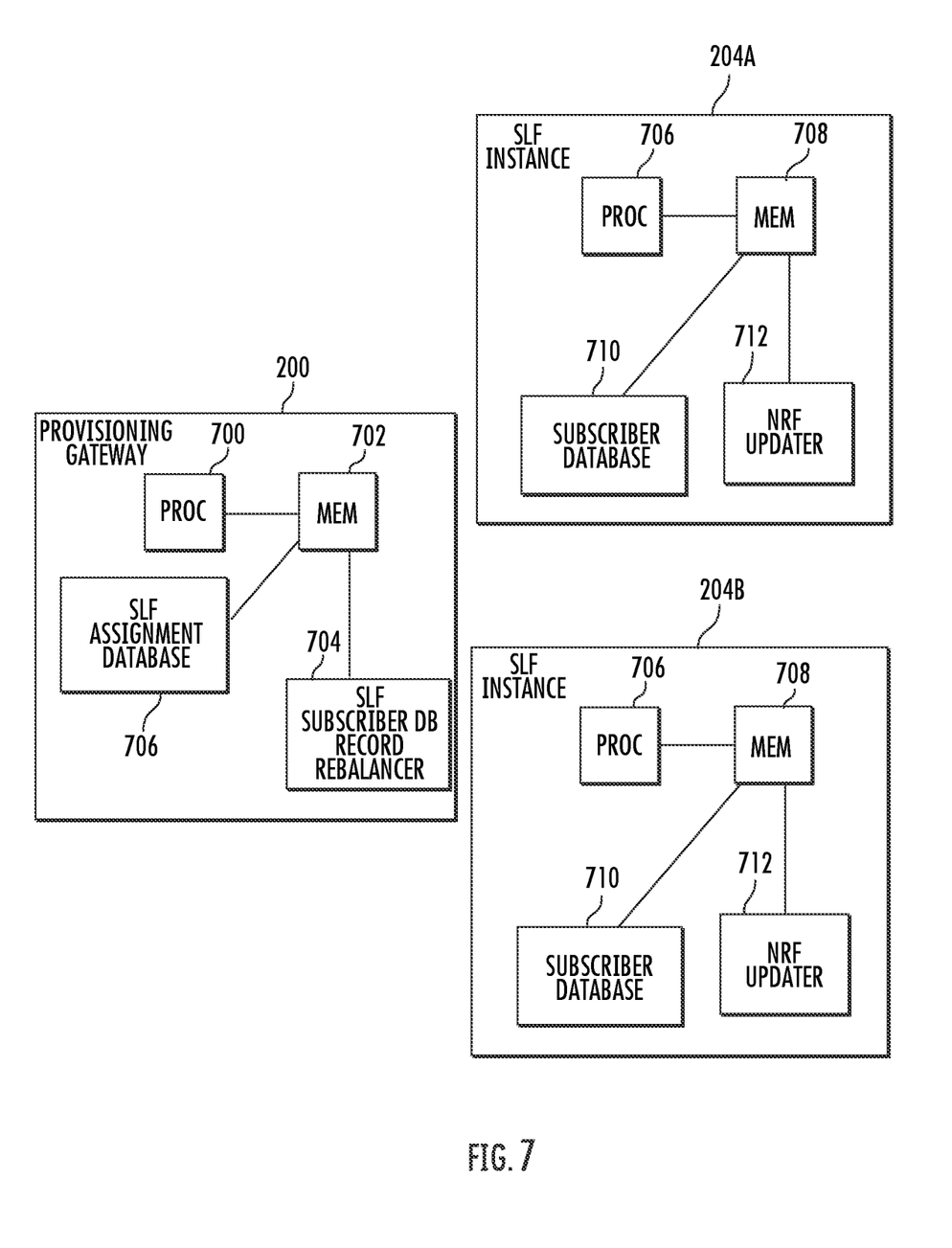
FIG. 7 is a block diagram of an exemplary system for rebalancing subscriber data among SLF instances.

FIG. 7 is a block diagram illustrating an exemplary system for rebalancing subscriber records with SLFs. Referring to FIG. 7, the system includes a provisioning gateway 200 and SLF instances 204A and 204B. Provisioning gateway 200 includes at least one processor 700 and a memory 702. Provisioning gateway 200 includes an SLF subscriber database record rebalancer 704 for performing the functions described herein to interface with a customer provisioning system to receive requests for rebalancing subscriber records and for signaling with SLF instances, such as SLF instances 204A and 204B to rebalance subscriber records. SLF subscriber database record rebalancer 704 may maintain an SLF assignment database 705 in memory 702 that indicates the subscriber identifier ranges that are assigned to each SLF instance. SLF subscriber database record rebalancer 704 may be implemented using computer executable instructions stored in memory 702B and executable by processor 700.

Each SLF instance 204A and 204B includes at least one processor 706 and memory 708. Each SLF instance 204A and 204B also includes a subscriber database 710 that contains records, each of which may be indexed by an MSISDN number and contains subscription information for a subscriber, including NF group ID information for the subscriber. Each SLF instance 204A and 204B also includes an NRF updater 712 to perform the signaling illustrated in FIG. 6 to update the NRF with SUPI ranges assigned to each SLF instance. NRF updater 712 may be implemented using computer executable instructions stored in memory 708 and executable by processor 706.

Figure 8:
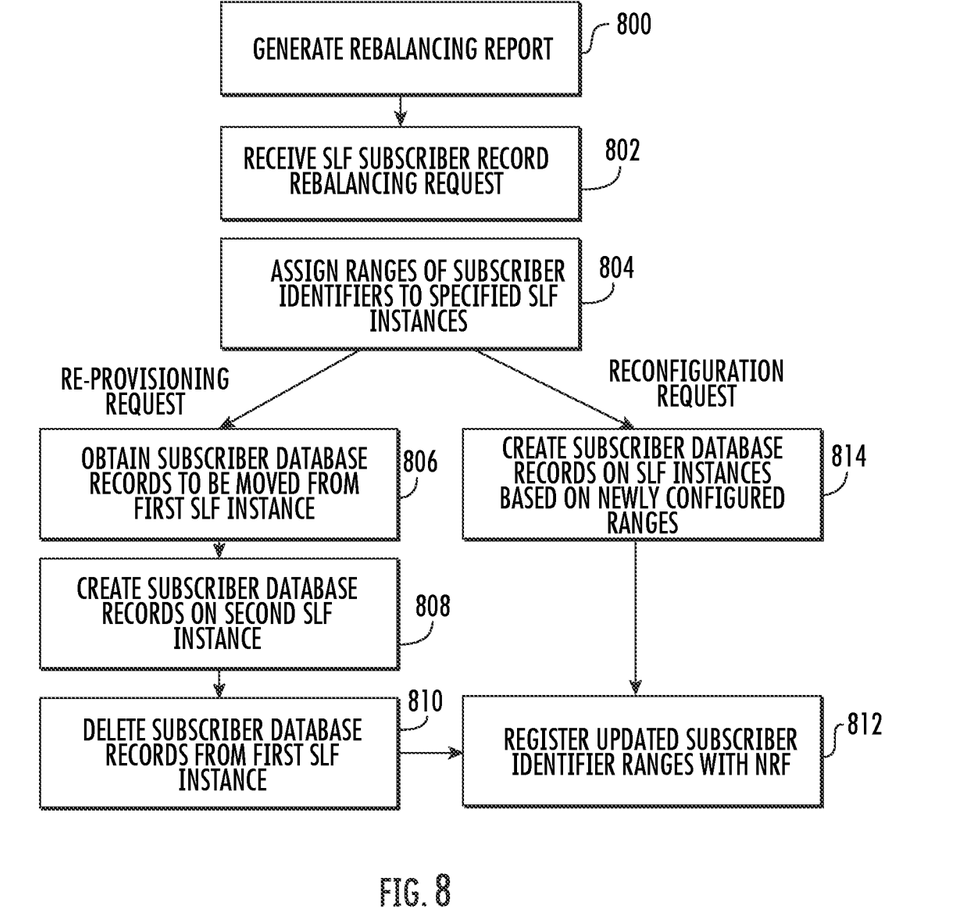
FIG. 8 is a flow chart illustrating an exemplary process for rebalancing subscriber data among SLF instances.

FIG. 8 is a flow chart illustrating an exemplary process for rebalancing subscriber records among SLF instances. Referring to FIG. 8, in step 800, a rebalancing report is generated. For example, the rebalancing report may be generated by provisioning gateway 200 in response to a request from a provisioning system, such as a customer or network operator provisioning system.

In step 802, an SLF subscriber rebalancing request is received. For example, provisioning gateway 200 may receive a re-provisioning request or a reconfigure request from a provisioning system, such as customer provisioning system 202. The request may identify one or more ranges of subscriber identifiers to be moved (for the re-provisioning case) or empty ranges to be re-assigned (for the reconfiguration case).

In step 804, the process includes assigning the ranges of subscriber identifiers to the specified SLF instances. For example, provisioning gateway 200 may create records in its SLF assignment database that identify subscriber identifier ranges and corresponding SLF instance identifiers. The structure of the SLF assignment database records may be similar to the rows in the rebalancing report, an example of which is illustrated in Table 1.

If the rebalancing request is a re-provisioning request, provisioning gateway 200 signals with the SLF instances transparently from the provisioning system to move the subscriber database records to the SLF instances corresponding to the newly assigned ranges. The process of moving the subscriber database records includes begins with step 806, where a subscriber database record to be moved is obtained from a first SLF instance. For example, provisioning gateway 200 may query an SLF instance for each subscriber identifier in a range of subscriber identifiers to be moved and obtain copies of the corresponding subscriber database records.

In step 808, a subscriber record corresponding to the record in the first SLF instance is created in a second SLF instance. For example, provisioning gateway 200 may send a create subscriber request message to the second SLF instance to create the subscriber record in the second SLF instance. The create subscriber request message may be formatted according to the API provided by the second SLF instance and may contain a copy of the subscriber record to be moved obtained from the first SLF instance. In step 808, the subscriber record is deleted on the first SLF instance. For example, provisioning gateway 200 may delete, on the first SLF instance, the subscriber record that has been move to the second SLF instance.

It should also be noted that in re-provisioning mode, in addition to moving subscriber database records among SLF instances, provisioning gateway 200 may also create subscriber database records on the SLF instances corresponding to the newly assigned ranges. For example, as new create subscriber requests are received by provisioning gateway 200, provisioning gateway 200 may signal with the corresponding SLF instance to create the subscriber database records on the SLF instance to which a subscriber identifier is assigned.

In step 812, updated subscriber identifier ranges are registered with the NRF. For example, each SLF instance may register its newly configured ranges of subscriber identifiers with the NRF using the NF update procedure illustrated above with regard to FIG. 6.

Returning to step 804, if the rebalancing request is a re-provisioning request, control proceeds to step 814 where subscriber database records are created on SLF instances based on newly configured ranges. For example, provisioning gateway 200 may receive create subscriber request messages for creating subscriber database records on SLF instances. In response, provisioning gateway 200 may read the subscriber identifier range assignments in the SLF assignment database and signal with the SLF instance corresponding to the range of subscriber identifiers in which the subscriber identifier in the create subscriber request message falls. Control then proceeds to step 816 where the SLF instances register their updated subscriber identifier ranges with the NRF.

It should be noted that in both the re-provisioning and reconfiguration modes, provisioning gateway 200 signals, transparently from the provisioning system, with the SLF instances to move existing records (re-provisioning mode only) and create new subscriber database records with the SLF instances corresponding to the newly assigned ranges.

The disclosure of each of the following references is hereby incorporated herein by reference in its entirety.

REFERENCES

1. $3^{rd}$ Generation Partnership Project; Technical Specification Group Core Network and Terminals; 5G System; Unified Data Repository Services; Stage 3; (Release 17) 3GPP TS 29.504 V17.7.0 (2022 June)
2. $3^{rd}$ Generation Partnership Project; Technical Specification Group Core Network and Terminals; 5G System; Network Function Repository Services; Stage 3 (Release 17) 3GPP TS 29.510 V17.6.0 (2022 June)
3. $3^{rd}$ Generation Partnership Project; Technical Specification Group Services and System Aspects; System architecture for the 5G System (5GS); Stage 2; (Release 17) 3GPP TS 23.501 V17.5.0 (2022 June)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for rebalancing subscriber location function (SLF) subscriber data, the method comprising:
    at a provisioning gateway including at least one processor, generating a rebalancing report and transmitting the rebalancing report to a provisioning system;
    receiving, at the provisioning gateway and from the provisioning system, a request to initiate re-provisioning of subscriber data among SLF instances, the request for re-provisioning identifying a first range of subscriber identifiers currently assigned to a first SLF instance to be re-assigned to a second SLF instance; and
    in response to the request to initiate the re-provisioning, signaling, by the provisioning gateway, transparently from the provisioning system, and with the first and second SLF instances to move subscriber database records having subscriber identifiers in the first range from a subscriber database maintained by the first SLF instance to a subscriber database maintained by the second SLF instance.

2. The method of claim 1 comprising:
    receiving, at the provisioning gateway and from the provisioning system, a request to reconfigure subscriber database records among the SLF instances, and, in response, assigning, to the second SLF instance, a second range of available subscriber identifiers currently assigned to the first SLF instance;
    receiving, by the provisioning gateway and from the provisioning system, a request to create, in the subscriber database maintained by the second SLF instance, a subscriber database record corresponding to a subscriber identifier within the second range; and in response, signaling with the second SLF instance to create, in the subscriber database maintained by the second SLF instance, the subscriber database record corresponding to the subscriber identifier in the second range.

3. The method of claim 1 wherein generating the rebalancing report includes generating a report that details empty ranges of subscriber identifiers assigned to the first SLF instance for a configured chunk size.

4. The method of claim 3 comprising generating the request to initiate the re-provisioning in response to a determination that that a number of empty ranges of subscriber identifiers assigned to the first SLF instance for the configured chunk size is below a minimum threshold value.

5. The method of claim 2 comprising generating the request for reconfiguring the subscriber identifier ranges in response to determining that a number of empty ranges of subscriber identifiers assigned to the first SLF instance for a configured chunk size exceeds a threshold value.

6. The method of claim 1 wherein the subscriber identifiers comprise at least one of mobile subscriber integrated services digital network (MSISDN) numbers, international mobile subscriber identifiers (IMSIs) and subscription permanent identifiers (SUPIs).

7. The method of claim 1 wherein signaling with the first and second SLF instances to move subscriber database records having subscriber identifiers in the first range includes querying the first SLF instance using an application programming interface (API) provided by the first SLF instance.

8. The method of claim 7 wherein signaling with the first and second SLF instances to move subscriber database records having subscriber identifiers in the first range includes creating the subscriber database records having the subscriber identifiers in the first range in the subscriber database maintained by the second SLF instance using an API provided by the second SLF instance.

9. The method of claim 1 comprising, at the provisioning gateway, signaling with the first and second SLF instances to inform the first and second SLF instance of changes in subscriber identifiers assigned to the first and second SLF instances.

10. The method of claim 9 comprising, at the first and second SLF instances, signaling with a network function repository function (NRF) to inform the NRF of the changes in subscriber identifiers assigned to the first and second SLF instances.

11. A system for rebalancing subscriber location function (SLF) subscriber data, the system comprising:
    a provisioning gateway including at least one processor; and
    an SLF subscriber database record rebalancer implemented by the at least one processor for generating a rebalancing report, transmitting the rebalancing report to a provisioning system, receiving, from the provisioning system, a request to initiate re-provisioning of subscriber data among SLF instances, the request for re-provisioning identifying a first range of subscriber identifiers currently assigned to a first SLF instance to be re-assigned to a second SLF instance, and, in response to the request to initiate the re-provisioning, signaling, by the provisioning gateway, transparently from the provisioning system, and with the first and second SLF instances to move subscriber database records having subscriber identifiers in the first range from a subscriber database maintained by the first SLF instance to a subscriber database maintained by the second SLF instance.

12. The system of claim 11 wherein the SLF subscriber database record rebalancer is configured to:

receive, from the provisioning system, a request to reconfigure subscriber database records among the SLF instances, and, in response, assigning, to the second SLF instance, a second range of available subscriber identifiers currently assigned to the first SLF instance;

receive, from the provisioning system, a request to create, in the subscriber database maintained by the second SLF instance, a subscriber database record corresponding to a subscriber identifier within the second range; and in response, signal with the second SLF instance to create, in the subscriber database maintained by the second SLF instance, the subscriber database record corresponding to the subscriber identifier in the second range.

13. The system of claim 11 wherein the rebalancing report details empty ranges of subscriber identifiers assigned to the first SLF instance for a configured chunk size.

14. The system of claim 13 the request to initiate the re-provisioning is generated in response to a determination that that a number of empty ranges of subscriber identifiers assigned to the first SLF instance for the configured chunk size is below a minimum threshold value.

15. The system of claim 12 wherein the request for reconfiguring the subscriber identifier ranges is generated in response to a determination that a number of empty ranges of subscriber identifiers assigned to the first SLF instance for a configured chunk size exceeds a threshold value.

16. The system of claim 11 wherein the subscriber identifiers comprise mobile subscriber integrated services digital network (MSISDN) numbers, international mobile subscriber identifiers (IMSIs) and subscription permanent identifiers (SUPIs).

17. The system of claim 11 the SLF subscriber database record rebalancer is configured to move subscriber database records having subscriber identifiers in the first range by querying the first SLF instance using an application programming interface (API) provided by the first SLF instance.

18. The system of claim 17 wherein the SLF subscriber database record rebalancer is configured to signal with the first and second SLF instances to move subscriber database records having subscriber identifiers in the first range by creating the subscriber database records having the subscriber identifiers in the first range in the subscriber database maintained by the second SLF instance using an API provided by the second SLF instance.

19. The system of claim 11 wherein the SLF subscriber database record rebalancer is configured to signal with the first and second SLF instances to inform the first and second SLF instance of changes in subscriber identifiers assigned to the first and second SLF instances.

20. A non-transitory computer readable medium having stored thereon executable instructions that when executed by a processor of a computer control the computer to perform steps comprising:

at a provisioning gateway, generating a rebalancing report and transmitting the rebalancing report to a provisioning system;

receiving, at the provisioning gateway and from the provisioning system, a request to initiate re-provisioning of subscriber data among subscriber location function (SLF) instances, the request for re-provisioning identifying a first range of subscriber identifiers currently assigned to a first SLF instance to be re-assigned to a second SLF instance; and in response to the request to initiate the re-provisioning, signaling, by the provisioning gateway, transparently from the provisioning system, and with the first and second SLF instances to move subscriber database records having subscriber identifiers in the first range from a subscriber database maintained by the first SLF instance to a subscriber database maintained by the second SLF instance.

* * * * *

UNITED STATES PATENT AND TRADEMARK OFFICE
CERTIFICATE OF CORRECTION

| | | |
|---|---|---|
| PATENT NO. | : 12,225,627 B2 | Page 1 of 1 |
| APPLICATION NO. | : 17/877551 | |
| DATED | : February 11, 2025 | |
| INVENTOR(S) | : Doddi | |

It is certified that error appears in the above-identified patent and that said Letters Patent is hereby corrected as shown below:

In the Specification

In Column 3, Line 20, delete "that that" and insert -- that --, therefor.

In Column 4, Line 37, delete "that that" and insert -- that --, therefor.

In the Claims

In Column 16, in Claim 4, Line 12, delete "that that" and insert -- that --, therefor.

In Column 17, in Claim 14, Line 26, delete "that that" and insert -- that --, therefor.

Signed and Sealed this
Fifteenth Day of July, 2025

Coke Morgan Stewart
*Acting Director of the United States Patent and Trademark Office*